Figure 5:
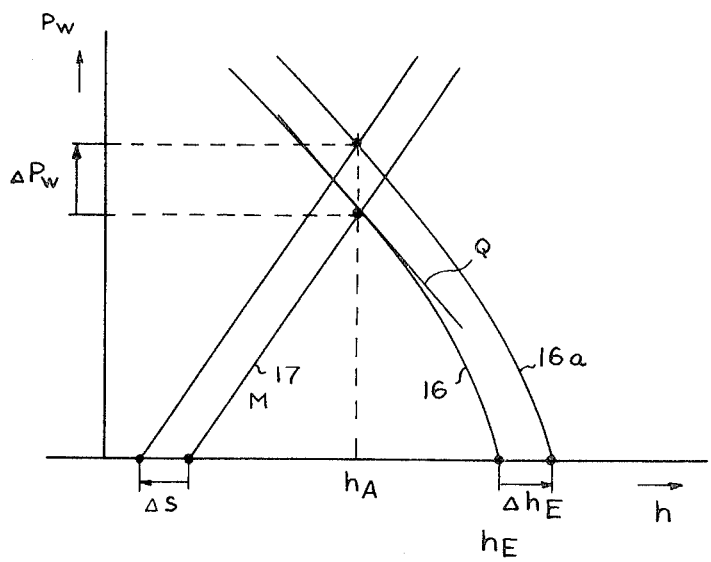

United States Patent
Lautenschlager

[15] 3,648,494
[45] Mar. 14, 1972

[54] SYSTEM FOR APPLYING PILOT CONTROL TO THE ROLL GAP ADJUSTMENT OF A GAUGE-CONTROLLED COLD ROLLING STAND

[72] Inventor: Helmut Lautenschlager, Grabenstrasse 3, Hemsbach, Germany

[22] Filed: Aug. 3, 1970

[21] Appl. No.: 60,537

[30] Foreign Application Priority Data

Aug. 6, 1969 Germany.....................P 19 40 006.7

[52] U.S. Cl.................................................72/8, 72/16
[51] Int. Cl................B21b 37/00, B21b 37/02, B21b 37/12
[58] Field of Search................................72/6–12, 16, 19–21

[56] References Cited
UNITED STATES PATENTS 3,574,280  4/1971  Smith, Jr......................................72/8
3,312,092  4/1967  Neumann ..................................72/13

Primary Examiner—Milton S. Mehr
Attorney—Pierce, Scheffler & Parker

[57] ABSTRACT

A system of applying pilot control to the roll gap adjustment of a gauge-controlled cold rolling stand. Included in the system are a gauge measuring apparatus for determining the incoming strip thickness, a differential computer for detecting changes in the gauge of the rolled strip, and delay means for the control signal to allow for running time of a point on the strip between the gauge-measuring location and the roll gap. Also included in the control is an evaluation system which takes into account deformation resistance of the rolled stock and of the roll stand constants in determination of the manipulated variable required for adjusting the roll gap.

3 Claims, 6 Drawing Figures

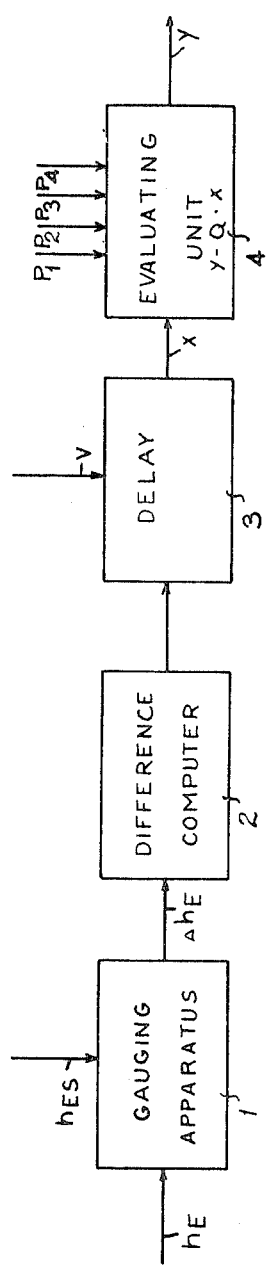
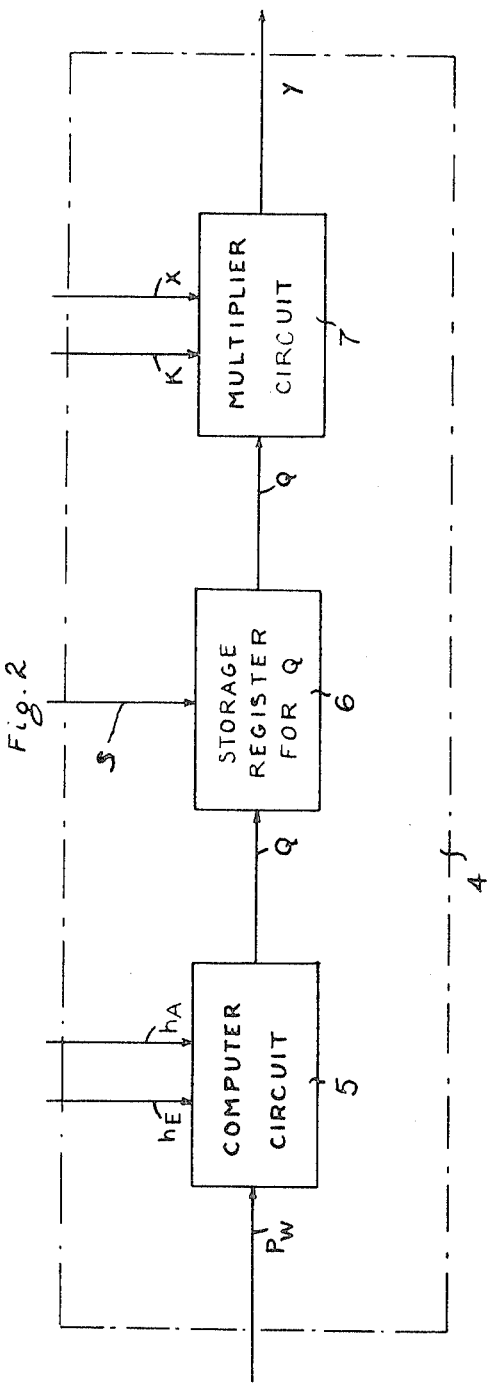

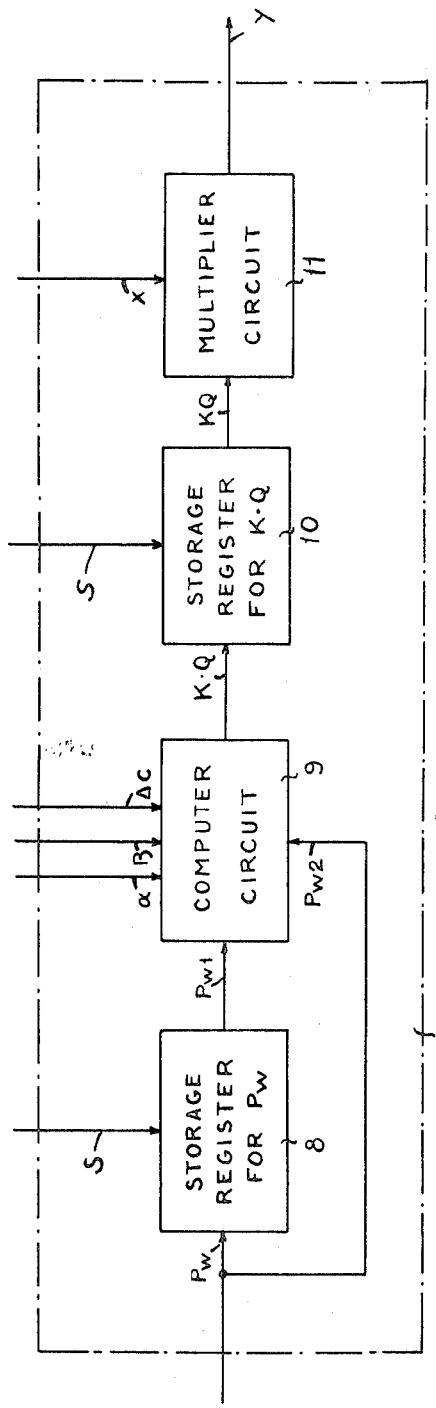
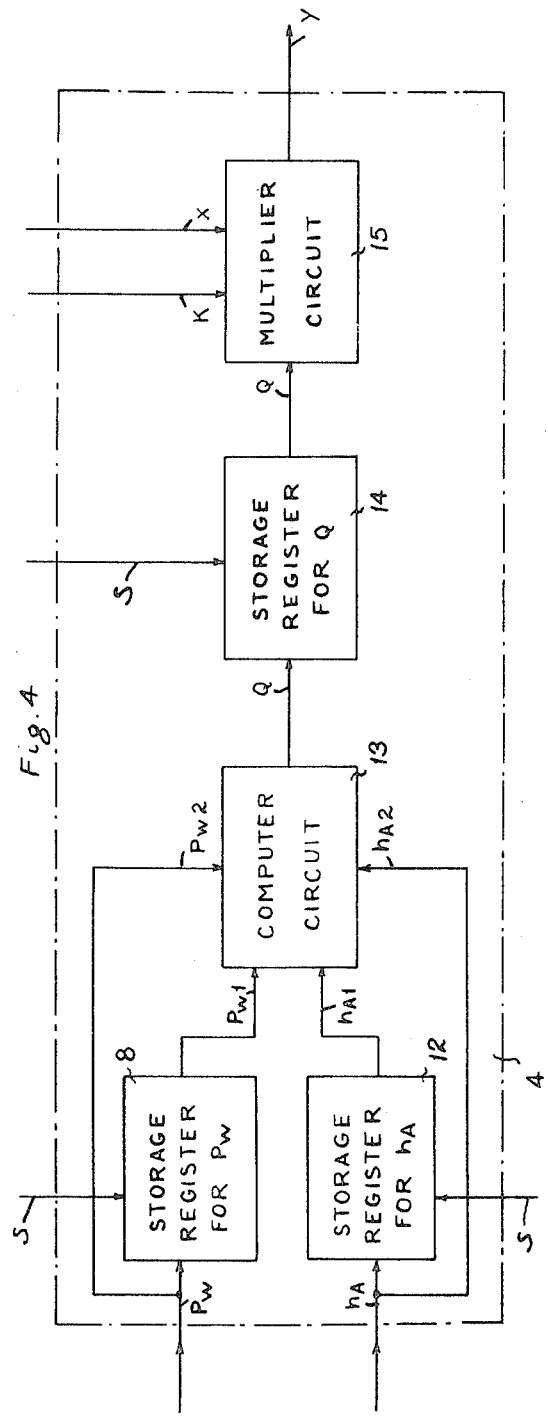

Patented March 14, 1972 3,648,494

3 Sheets-Sheet 3

$\Delta P_R = \Delta P_A - \Delta P_W$

INVENTOR.
Helmut Lautenschläger
BY
Pierce, Scheffler & Parker
Attorneys

SYSTEM FOR APPLYING PILOT CONTROL TO THE ROLL GAP ADJUSTMENT OF A GAUGE-CONTROLLED COLD ROLLING STAND

The subject matter of the present invention relates to a system for applying pilot control to the roll gap adjustment of a gauge-controlled cold rolling stand, comprising of gauge measuring apparatus for determining the incoming strip thickness, a differential computer for detecting gauge changes, delay means for the control signal to allow for the running time of the rolled stock between measuring location and roll gap and an evaluating system for taking into account the deformation resistance of the rolled stock and of the roll stand constants when determining the manipulated variable required for adjusting the roll gap.

The system is provided for supplementing a gauge-control system in which detection of the measured gauge value is subject to dead time. An example of such a regulating system is described in a Patent Application P 17 77 154.9 filed in West Germany but the application of the invention is not confined to such a regulating system. Various regulating systems and the effect of dead time on the quality of gauge control are examined in the above-mentioned patent application and in an earlier filed patent application P 15 27 613.8 in West Germany thus dispensing with the need for discussing it in this context.

The prior art discloses a plurality of systems for gauge-control some of which also include disturbance-variable feedforward obtained from the gauge deviation measured on the inlet side. However, dimensioning of the control signal for the most accurate possible gauge correction on the basis of the deviation measured on the inlet side is subject to extensive uncertainty because the deformation resistance of the rolled stock may vary within wide limits and no reference data of its magnitude are available.

It is the object of the invention to produce a control signal from the measured gauge value of the material running into the roll gap, taking into account the elastic properties of the roll stand and the deformation resistance of the rolled stock. The control signal thus obtained is delayed in relation to the rolling speed and acts on the strip thickness by means of the final control element of the regulating system in such a way as to substantially avoid any changes of gauge of the emerging strip due to gauge changes of the material running into the roll stand. The accuracy of a gauge control system can thus be substantially improved. Three different methods may be employed.

According to these methods the invention is characterized by evaluation means so constructed that the manipulated variable $y$ (method A) is formed in accordance with the formula $$y = K \cdot Q \cdot x,$$

where $K$ is a constant depending on the roll stand, $Q$ is a measure of the deformation resistance of the rolled stock and $X$ is a quantity depending on the incoming strip thickness, said manipulated variable being formed by means of a multiplier supplied with the quantity $Q$ obtained from a register to which it is supplied in passes and in accordance with a control signal obtained from a computer circuit which determines the quantity $Q$ in accordance with the formula $$Q = \frac{P_w}{h_E - h_A}$$

where $P_w$ is the rolling force and $h_E$ or $h_A$ refers to the incoming or emerging strip thickness respectively.

The invention is further characterized by an evaluating system which is constructed so that a multiplier is provided for forming the manipulated variable $y$ (method B) in accordance with the formula $$y = \frac{x}{\alpha + \dfrac{\beta \cdot \Delta c}{\Delta P_w}}$$

where $x$ is a quantity which depends on the gauge of the incoming strip, $\beta = a/K$ and $\beta = b/K$ being constants which $K$ related to the roll stand, $\Delta c$ being the change of manipulated variable and $\Delta P_w = P_{w1} - P_{w2}$ is the change of rolling force, the quantity $K \cdot Q$ being supplied to the multiplier from a register into which it is supplied in passes and in accordance with a control signal from a computer circuit which determines the quantity $KQ$ in accordance with the formula $$KQ = \frac{K}{a + \dfrac{b \cdot \Delta c}{\Delta P_w}}$$

the change of rolling force $\Delta P_w$ being determined by the rolling force $P_{w1}$ prior to the change of manipulated variable being retained in a register and in accordance with a control signal and is then supplied, together with the rolling force $P_{w2}$ to the computer circuit immediately after the change of manipulated variable.

Finally, the invention is characterized by an evaluating system constructed so that a multiplier is provided for forming the manipulated variable $y$ (method C) in accordance with the formula $$y = K \cdot Q \cdot x$$

said multiplier being supplied with the quantity $Q$ from a register into which it is fed in passes and in accordance with a control signal from a computer circuit which determines the quantity $Q$ in accordance with the formula $$Q = \frac{\Delta P_w}{\Delta h_A}$$

where $\Delta h_A = h_{A1} - h_{A2}$ refers to the change of gauge of the emerging strip, the change of rolling force $\Delta P_w = P_{w1} - P_{w2}$ and the gauge change $\Delta h_A = h_{A1} - h_{A2}$ are determined by the rolling force $P_{w1}$ and the gauge thickness $h_{A1}$ prior to the change of manipulated variable are retained in one register each in accordance with a control signal and are then supplied, together with the values $P_{w2}$ or $P_{A2}$ respectively to the computer circuit immediately after the manipulated variable has changed.

No separate definitions are made regarding the choice of means for performing the computer and register processes required in this context. Known analogue or digital structural elements or modules may be employed to this end, in particular it is possible for the logic functions to be performed by means of a digital computer which is adapted for free programming. In the last mentioned case the digital computer may also take over the control algorithm for the appropriate gauge control.

FIG. 1 discloses the general embodiment of the invention. Special embodiments are characterized mainly by the choice of the manipulated variable for influencing the strip gauge and by the method selected for determining the deformation resistance of the rolled stock.

The differential computer 2 compares two values of the deviation supplied by the gauge control apparatus 1 and occurring in succession with respect to time. The differential computer contains a register for the first measured value and a subtracting circuit for computing the difference between two measured values. It is the function of the differential computer to determine a change of gauge of the incoming strip referred to a section of length. The deviation itself must not result in a change of manipulated variable: only a change of gauge of the incoming strip should produce this result. Expressed in other words, the roll gap may be adjusted by other means (for example manual adjustment) so that the delivered strip is not subject to any deviation despite deviations from the set value of the incoming strip, the pilot control system may therefore alter the manipulated variable only in the event of a change of gauge of the incoming strip.

The differential computer 2 may be omitted if the pilot control system cooperates with a gauge control which constantly biases the manipulated variable in the same way as the pilot control system. The regulating apparatus will then itself produce the necessary equilibrium in the roll gap. In this case it is possible for the deviation from the set value of the incoming strip to be transferred directly to the delay circuit 3. The delay circuit 3 delays the signal by a period of time which is required by the strip to traverse from the measuring position to the roll gap (final control location). This time is inversely proportional to the rolling speed $v$ which is supplied to the delay circuit. The correcting period of the final control element may be taken into account in dimensioning the delay period.

The output signal of the delay circuit 3, that is to say the delayed signal, is referenced by the letter $x$. The signal $x$ is the input signal for the evaluating unit 4. The evaluating unit 4 performs two functions. Firstly the computation and registering of the deformation resistance $Q$ of the rolled stock at the beginning of the pass from the rolling parameters and roll stand constants $P_1$ to $P_4$, fed into the system, secondly the continuous computation of the manipulated variable $y$ by means of the input signal $x$ and the stored value of the deformation resistance $Q$. The starting value of the evaluation unit is the manipulated variable $y$.

The invention includes three different embodiments of the evaluation unit 4 which operate in each case in accordance with a separate method for determining the deformation resistance. These methods and the arrangement resulting therefrom for the evaluation unit 4 are described in detail hereinbelow. In each case they are approximations of a greater or lesser degree of accuracy but being sufficiently accurate for the intended application as can be easily proved by computation of the errors.

The slope $Q$ of the plastic characteristic (FIG. 5) is used as a measure of the deformation resistance of the rolled stock. The plastic characteristic represents the relationship between the roll gap and the rolling force.

All methods designed to determine the slope $Q$ assume the presence on the roll stand concerned of apparatus for measuring the rolling force.

In assuming that the slope $Q$ of the plastic characteristic has been determined in some manner, it is possible for the manipulated variable $y$ to be computed in accordance with the relationship $$y = K \cdot Q \cdot x \cdot$$

In this expression, $K$ is a constant, depending on the roll stand and $x$ is a variable which is proportional to the gauge of the incoming strip but is transformed in the manner described hereinabove (see FIG. 1). The general relationship specified herein will be explained in detail by reference to special arrangements arising from the choice of certain manipulated variables.

Method A for determining the slope $Q$ of the plastic characteristic

This method is based on a complete linearization of the plastic characteristic of the rolled stock. This slope of the characteristic can therefore be computed as the quotient of the rolling force $P_w$ which occurs during the rolling operation, and the difference between the gauge of the incoming strip $h_E$ and the gauge of the emerging strip $h_A$, that is to say, $$Q = \frac{P_w}{h_E - h_A}$$

This is a comparatively rough approximation but detection and processing of the measured value is very simple and accurate (relatively large measured values so that any minor fluctuations which are always present, do not have any substantial influence on the result). The arrangement of the evaluation unit 4 resulting from this method is illustrated in FIG. 2.

The computer circuit 5 is constructed in accordance with known methods. In this computer circuit first forms the difference $h_E - h_A$ and then the quotient $P_w/(h_E - h_A)$. The output signal of the circuit 5 is the value $Q$ which is retained in the register 6. The register 6 is supplied with a control signal S which permits registration only for certain operative states of the roll stand, for example during threading up, and leaves the register content unchanged during the remaining operating phases. Finally, the multiplier circuit 7 continuously forms the manipulated variable $y$ in accordance with the relationship $y = K \cdot Q \cdot x$. FIG. 2 illustrates the number and kind of input variables of the evaluation unit 4 constructed in accordance with the method A.

Method B for determining the slope $Q$ of the plastic characteristic

The following method linearizes the plastic characteristic only in a very small zone (differential method). The magnitude of the roll gap is changed by reference to a defined change of manipulated variable and the resultant change of rolling force is measured. The value of $Q$ may then be calculated from the known amount of change of manipulated variable $\Delta c$ and the measured value of the change of rolling force $\Delta P_w$ in accordance with the relationship $$Q = \frac{1}{a + \frac{b \cdot \Delta c}{\Delta P_w}}$$

In this expression, $a$ and $b$ are constants which depend on the roll stand.

If the constants which depend on the roll stand are expressed as $\alpha = a/K$ and $\beta = b/K$ because $y = K \cdot Q \cdot x$, the manipulated variable $y$ may be obtained in accordance with method B as follows:

$$y = \frac{x}{\alpha + \frac{\beta \cdot \Delta c}{\Delta P_w}}$$

FIG. 3 shows the arrangement of the evaluation unit 4 in accordance with the method B. The register 8 stores the value of the rolling force $P_{w1}$ prior to the change of manipulated variable S (control signal). The rolling force has the value $P_{w2}$ immediately after the manipulated variable is changed by the amount $\Delta c$. The difference $\Delta P_w = P_{w1} - P_{w2}$ is formed by known methods in the computer circuit 9 and this is used to form the quotient $\beta \cdot \Delta c/\Delta P_w$ to which the constant $\alpha$ is added. The inverse value of this intermediate quantity supplies the required amount $K \cdot Q$ which is retained in the succeeding register 10. The multiplier 11 computes the manipulated variable $y$ in known manner.

The number and kind of input variables required for the evaluation unit 4 according to method B may be obtained from FIG. 3. The roll stand constants $\alpha$ and $\beta$ must be defined once, most conveniently by measurement.

Method C for determining the slope Q of the plastic characteristic

This method is also of the differential kind with a defined change of manipulated variable for biasing the roll gap. In this case, the change of rolling force $\Delta P_w$ as well as the change of the rolled gauge $\Delta h_A$ as the result of a change of manipulated variable are measured. Under these conditions $$Q = \Delta P_w / \Delta h_A$$

FIG. 4 shows the corresponding arrangement of the evaluation unit 4 according to method C. This method is the most complex because it requires a register 8 for the rolling force $P_{w1}$ (in the same way as in method B) as well as a register 12 for the thickness $h_{A1}$ of the strip prior to a change of manipulated variable. The index 2 of these quantities is associated with the values immediately after the change. The computer unit 13 forms the difference values $\Delta P_w = P_{w1} - P_{w2}$ and $\Delta h_A = h_{A1} - h_{A2}$ and from this forms the quotient $\Delta P_w / \Delta h_A$. The value of $Q$ is registered and the manipulated variable $y$ is computed in units 14 or 15 respectively in the manner already described hereinbefore.

Some special arrangements according to the invention are described hereinbelow, the kind of manipulated variable being predetermined. Accordingly, the necessary roll stand constants are also defined in greater detail.

To roll travel as manipulated variable

The roll gap can be influenced in known manner by the screw-down of the upper rolls. To this end, the characteristics of the roll stand can be obtained from the known rolling force roll gap diagram, shown in FIG. 5.

The rolled stock of thickness $h_E$ runs into the roll gap and is deformed under the effect of the rolling force in accordance with the plastic characteristic 16, the slope of which is $Q$ at the operating point. The rolling force deforms the roll stand approximately elastically in accordance with Hook's law; the stretch of the roll gap is indicated by the straight line 17 having the slope M. The point of intersection of the straightline 17 with the plastic characteristic (operating point) defines the rolled strip thickness $h_A$. Any change of the incoming gauge by the amount $\Delta h_E$ results in a parallel displacement of the characteristic 16 on the $h$-axis (new line 16a). In order to maintain the gauge of the delivered material at a constant value it is necessary for the characteristic 17 to be displaced in the opposite direction in parallel to the $h$-axis and by the amount $\Delta s$ (top roll screw down travel) the geometrical relationships provide the following change of top roll screw-down as $$\Delta s = (Q/M) \cdot \Delta h_E$$

This will take the form of the earlier mentioned general relationship $$y = K \cdot Q \cdot x$$

if the regulating travel of the top roll screw-down is used as the manipulated variable. The overall elastic constant $1/M$ of the roll stand is the constant $K$ which depends on the said roll stand.

To obtain the slope $Q$ of the plastic characteristic 16 it is possible for the methods A, B or C to be optionally employed. The methods A and C do not depend on the kind of manipulated variable and do not therefore require any further explanations.

The general equation expressing the value of $Q$ in accordance with method B when the top roll screw-down undergoes a defined change by the amount $c = s_o$ takes the form of $$Q = \frac{1}{\frac{1}{M} + \frac{\Delta s_o}{\Delta P_w}}$$

If the gauge of the incoming strip during the rolling operation varies by the amount $h_E$ by measurement, it will be necessary for the control apparatus according to FIG. 1 to adjust the top roll screw-down by the amount $$\Delta s = \frac{\Delta h_E}{1 + M \frac{\Delta s_o}{\Delta P_w}}$$

if the gauge of the delivered strip is to remain constant. The computer operations and register operations required to this end are performed in the evaluation unit 4 according to FIG. 3. Comparison with the general equation established to this end indicates that $\alpha = 1$ and $\beta = M$ expresses the constants in this case.

PRELOADING OF THE CHOCKS AS THE MANIPULATED VARIABLE

This case is based on a design of the stand described in detail in the patent application P 17 77 154.9 and in the accompanying illustration. This stand is pre-loaded, the preloading force acting between the chocks of the backing rolls. Stands of this kind are known and are not subject of the invention.

Figure 6:
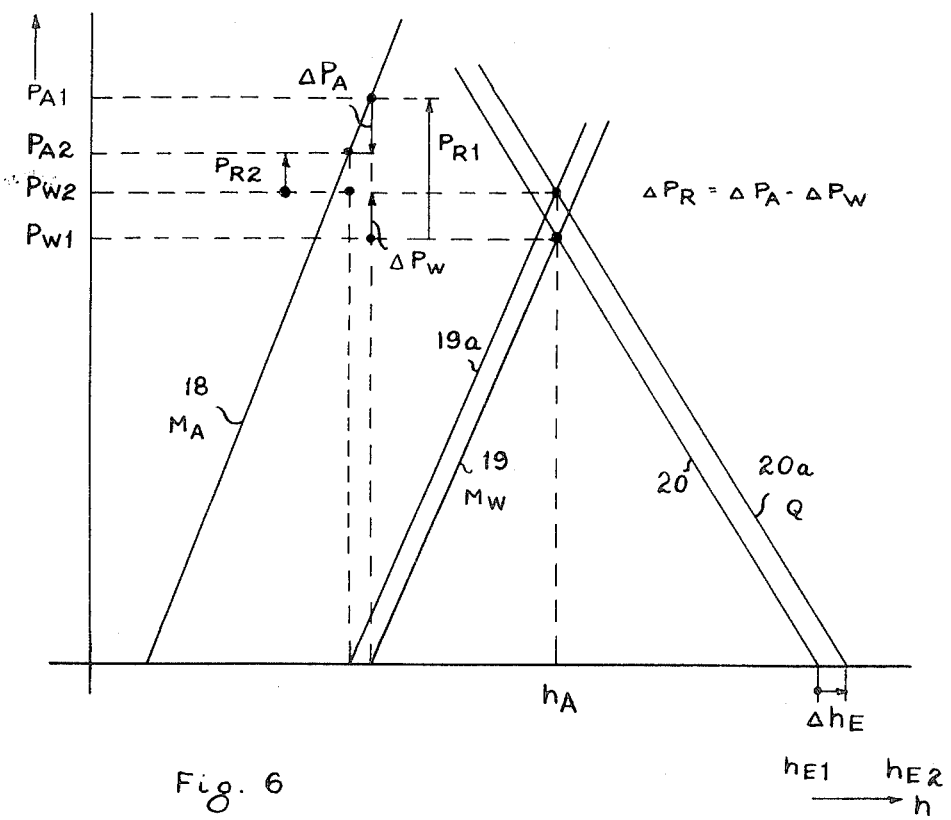

The force roll gap diagram for such stands and according to the invention is illustrated in FIG. 6.

The screw-down force $P_A$ loads the roll stand and comprises the reaction of the rolled stock $P_w$ and the preloading force $P_R$.

Assuming linear conditions, the roll stand will stretch due to $P_A$ and in accordance with the straightline 18 having the slope $M_A$. The chock may be assumed to deform due to the rolling force in accordance with the straight line 19. For the sake of simplicity, the plastic characteristic 20 is also plotted as a straight line having the slope $Q$. The point of intersection of the straight line 19 with 20 defines the size of the roll gap which also represents the delivery gauge $h_A$.

If the gauge of the incoming strip changes from the value $h_{E1}$ by the amount $\Delta h_E$ to the amount $h_{E2}$, this is equivalent to a parallel displacement of the plastic characteristic from 20 to 20a. According to the invention the screw-down force $P_R$ is to be changed accurately by the amount $\Delta P_R$ which remains the delivery gauge $h_A$ at a constant value. FIG. 6 discloses that under these conditions both the screw-down force $P_A$ as well as the rolling force $P_w$ must change correspondingly, that is to say, $$\Delta P_R = P_A - \Delta P_w.$$

The required screw-down force change will then be obtained from the geometrical relationships of FIG. 6 as $$\Delta P_R = (1 + M_A / M_w) Q \cdot \Delta h_E$$

This equation can be simplified still further if due allowance is made for the fact that the overall module $M$ of the roll stand is calculated from the modules $M_A$ of the stand and $M_w$ of the roll chocks in accordance with the relationship $$M = \frac{M_A \cdot M_w}{M_A + M_w}$$

Under these conditions $$\Delta P_R = (M_A/M) \cdot Q \cdot \Delta h_E$$

The roll-stand-dependent constant $K$ in this case is $K = M_A / M$, that is to say the ratio of roll stand module to overall module of the stand.

The slope $Q$ of the plastic characteristic may once again be obtained by the method A, B or C. If the preloading force is changed by a defined amount $\Delta c = \Delta P_{Ro}$ the method B will take the form $$Q = \frac{1}{\frac{1}{M} + \frac{1}{M_A} \cdot \frac{\Delta P_{Ro}}{\Delta P_w}}$$

This equation can also be derived from FIG. 6. According to the invention the change of manipulated variable as the result of the control function during rolling will then take the form $$\Delta P_R = \frac{\Delta h_E}{\frac{1}{M} + \frac{M}{M_A^2} \frac{\Delta P_{Ro}}{\Delta P_w}}$$

if the gauge of the incoming strip varies by $h_E$. The constants of the general equation in this case are $$\alpha = 1/M_A \text{ and } \beta (M_2/M_A).$$

I claim:

1. A system for applying pilot control to a roll gap adjustment of a gauge-controlled cold rolling stand for rolling metal strip, comprising a gauge measuring apparatus for determining the incoming strip thickness, a differential computer for detecting gauge changes of said incoming strip and supplying a control signal proportional thereto, delay means for the control signal to allow for running time of the rolled strip between measuring location and roll gap and an evaluating system for taking into account deformation resistance of the rolled strip and of roll stand constants when determining a manipulated variable $y$ required for adjusting the roll gap, said evaluation system so constructed that the manipulated variable $y$ is formed in accordance with the formula $$y = K \cdot Q \cdot x$$

where $K$ is a constant depending on the roll stand, $Q$ is a measure of deformation resistance of the rolled strip and $x$ is a quantity depending on the incoming strip thickness, said manipulated variable being formed by means of a multiplier supplied with the quantity $Q$ obtained from a register to which it is supplied in passes and in accordance with another control signal obtained from a computer circuit which determines the quantity $Q$ in accordance with the formula $$Q = \frac{P_w}{h_E - h_A}$$

where $P_w$ is the rolling force and $h_E$ and $h_A$ refers to the incoming and emerging strip thickness respectively.

2. A system for applying pilot control to a roll gap adjustment of a gauge-controlled cold rolling stand for rolling metal strip, comprising a gauge measuring apparatus for determining the incoming strip thickness, a differential computer for detecting gauge changes of said incoming strip and supplying a control signal proportional thereto, delay means for the control signal to allow for running time of the rolled strip between measuring location and roll gap and an evaluating system for taking into account deformation resistance of the rolled strip and of roll stand constant when determining a manipulated variable $y$ required for adjusting the roll gap said evaluation system which is constructed so that a multiplier is provided for forming the manipulated variable $y$ in accordance with the formula $$y = \frac{x}{\alpha + \frac{\beta \cdot \Delta c}{\Delta P_w}}$$

where $x$ is a quantity which depends on the gauge of the incoming strip, $\alpha = a/K$ and $\beta = b/K$ being constants which are related to the roll stand, $\Delta c$ being the change of the manipulated variable and $\Delta P_w = P_{w1} - P_{w2}$ is the change of rolling force, the quantity $K \cdot Q$ being supplied to the multiplier from a register into which it is supplied in passes and in accordance with another control signal from a computer circuit which determines the quantity $KQ$ in accordance with the formula $$KQ = \frac{K}{a + \frac{b \cdot \Delta c}{\Delta P_w}}$$

the change of rolling force $\Delta P_w$ being determined by the rolling force $P_{w1}$ prior to the change of the manipulated variable and being retained in a register and in accordance with a third control signal and is then supplied, together with the rolling force $P_{w2}$ to the computer circuit immediately after the change of the manipulated variable.

3. A system for applying pilot control to a roll gap adjustment of a gauge-controlled cold rolling stand for rolling metal strip, comprising a gauge measuring apparatus for determining the incoming strip thickness, a differential computer for detecting gauge changes of said incoming strip and supplying a control signal proportional thereto, delay means for the control signal to allow for running time of the rolled strip between measuring location and roll gap and an evaluating system for taking into account deformation resistance of the rolled strip and of roll stand constants when determining a manipulated variable $y$ required for adjusting the roll gap, said evaluation system constructed so that a multiplier is provided for forming the manipulated variable $y$ in accordance with the formula $$y = K \cdot Q \cdot x$$

said multiplier being supplied with the quantity $Q$ from a register into which it is fed in passes and in accordance with another control signal from a computer circuit which determines the quantity $Q$ in accordance with the formula $$Q = \Delta P_w / \Delta h_A$$

where $\Delta h_A = h_{A1} - h_{A2}$ refers to a change of gauge of the emerging strip and $Pw\ Pw_1 - Pw_2$ refers to a change of rolling force, $Pw$ and $h$ being determined from the rolling force $P_{w1}$ and the gauge thickness $h_{A1}$ prior to a change of the manipulated variable and are retained in one register each in accordance with a third control signal and are then supplied, together with the values $P_{w2}$ or $P_{A2}$ respectively to the computer circuit immediately after the manipulated variable has changed.

* * * * *

UNITED STATES PATENT OFFICE
CERTIFICATE OF CORRECTION

Patent No. 3,648,494　　　　　　　　Dated March 14, 1972

Inventor(s) HELMUT LAUTENSCHLAGER

It is certified that error appears in the above-identified patent and that said Letters Patent are hereby corrected as shown below:

In the heading of the patent the identity of the assignee, to wit: AKTIENGESELLSCHAFT BROWN, BOVERI & CIE., BADEN, SWITZERLAND should appear.

Signed and sealed this 15th day of August 1972.

(SEAL)
Attest;

EDWARD M. FLETCHER, JR.　　　　　　ROBERT GOTTSCHALK
Attesting Officer　　　　　　　　　　Commissioner of Patents